US012063722B2

(12) United States Patent
Kanj

(10) Patent No.: US 12,063,722 B2
(45) Date of Patent: Aug. 13, 2024

(54) METHOD FOR CORRECTING A LIGHT PATTERN, AUTOMOTIVE LIGHTING DEVICE AND AUTOMOTIVE LIGHTING ASSEMBLY

(71) Applicant: VALEO VISION, Bobigny (FR)

(72) Inventor: Ali Kanj, Bobigny (FR)

(73) Assignee: VALEO VISION, Bobigny (FR)

( * ) Notice: Subject to any disclaimer, the term of this patent is extended or adjusted under 35 U.S.C. 154(b) by 417 days.

(21) Appl. No.: 17/434,913

(22) PCT Filed: Jan. 30, 2020

(86) PCT No.: PCT/EP2020/052366
§ 371 (c)(1),
(2) Date: Aug. 30, 2021

(87) PCT Pub. No.: WO2020/177959
PCT Pub. Date: Sep. 10, 2020

(65) Prior Publication Data

US 2022/0155177 A1 May 19, 2022

(30) Foreign Application Priority Data

Mar. 1, 2019 (EP) .................................... 19160393

(51) Int. Cl.
*H05B 45/10* (2020.01)
*F21S 41/153* (2018.01)
(Continued)

(52) U.S. Cl.
CPC ............. *H05B 45/10* (2020.01); *H05B 45/14* (2020.01); *H05B 45/44* (2020.01); *F21S 41/153* (2018.01)

(58) Field of Classification Search
CPC ........ F21S 41/153; F21S 43/14; F21S 41/141; F21S 41/39; F21S 43/19; F21S 43/26;
(Continued)

(56) References Cited

U.S. PATENT DOCUMENTS 6,754,037 B1 6/2004 Ostwald et al.
7,868,857 B2 1/2011 Nathan et al.
(Continued)

FOREIGN PATENT DOCUMENTS

CN 101159121 A 4/2008
CN 101194300 A 6/2008
(Continued)

OTHER PUBLICATIONS

Japanese Office Action issued on Nov. 18, 2022 in Japanese Patent Application No. 2021-551796 (with English translation), 13 pages.
(Continued)

*Primary Examiner* — Monica C King
(74) *Attorney, Agent, or Firm* — Oblon, McClelland, Maier & Neustadt, L.L.P.

(57) ABSTRACT

The invention provides a method for correcting a first light pattern provided by a lighting device (1) with a matrix of light sources (2). This method comprising the steps of obtaining a map of the light pattern divided in pixels (4), associating a calibration power value to each pixel (4), depending on the light intensity of each pixel and assigning a new power value to each pixel. Finally, a corrected light pattern is projected with the new power values. The invention also provides an automotive lighting device with a calibrator to perform the steps of this method and an automotive lighting assembly with an external calibrator to perform the steps of this method.

19 Claims, 3 Drawing Sheets

Figure 1:
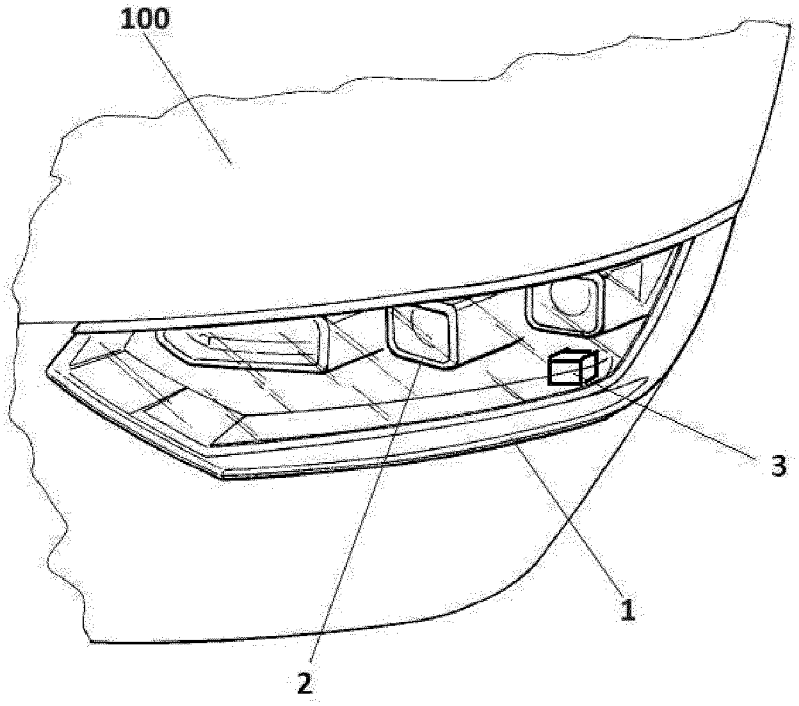

(51) Int. Cl.
*H05B 45/14* (2020.01)
*H05B 45/44* (2020.01)

(58) Field of Classification Search
CPC ........ F21S 43/37; F21S 41/151; F21S 41/172; F21S 41/18; F21S 45/33; F21Y 2115/10; F21Y 2105/10; H05B 45/00; H05B 45/10; H05B 45/52
See application file for complete search history.

(56) References Cited

U.S. PATENT DOCUMENTS

| | | | |
|---|---|---|---|
| 2001/0013990 | A1 | 8/2001 | Ostwald et al. |
| 2003/0001807 | A1* | 1/2003 | Debiez ................... H04N 1/401 345/82 |
| 2003/0007283 | A1 | 1/2003 | Ostwald et al. |
| 2004/0070864 | A1 | 4/2004 | Ostwald et al. |
| 2004/0105264 | A1* | 6/2004 | Spero .................. F21V 23/0471 362/276 |
| 2006/0273997 | A1 | 12/2006 | Nathan et al. |
| 2011/0199395 | A1 | 8/2011 | Nathan et al. |
| 2012/0206050 | A1* | 8/2012 | Spero ................... H05B 45/395 315/152 |
| 2013/0286055 | A1 | 10/2013 | Nathan et al. |
| 2015/0097931 | A1 | 4/2015 | Hatzilias et al. |
| 2017/0305327 | A1 | 10/2017 | Hoffmann et al. |
| 2018/0047325 | A1 | 2/2018 | Biwa et al. |
| 2018/0247585 | A1 | 8/2018 | Kanayama et al. |
| 2018/0255622 | A1* | 9/2018 | Spero ..................... B60Q 1/085 |
| 2021/0162912 | A1* | 6/2021 | Spero ................... H05B 45/395 |

FOREIGN PATENT DOCUMENTS

| | | | |
|---|---|---|---|
| CN | 105530513 | A | 4/2016 |
| DE | 10 2016 210 147 | A1 | 12/2017 |
| EP | 2 416 139 | A1 | 2/2012 |
| JP | 2007-172890 | A | 7/2007 |
| JP | 2007-227166 | A | 9/2007 |
| JP | 2008-159550 | A | 7/2008 |
| JP | 2012-33377 | A | 2/2012 |
| JP | 2016-203863 | A | 12/2016 |

OTHER PUBLICATIONS

International Search Report issued on May 12, 2020 in PCT/EP2020/052366 filed on Jan. 30, 2020.
Combined Chinese Office Action and Search Report issued Jul. 19, 2023 in Chinese Application 202080017748.6, (with English translation), 14 pages.

* cited by examiner

METHOD FOR CORRECTING A LIGHT PATTERN, AUTOMOTIVE LIGHTING DEVICE AND AUTOMOTIVE LIGHTING ASSEMBLY

TECHNICAL FIELD

This invention is related to the field of automotive lighting devices, and more particularly, to the way light patterns are managed.

STATE OF THE ART

Digital lighting devices are being increasingly adopted by car makers for middle and high market products.

These digital lighting devices usually rely on pixelated technologies. Such digital light sources are composed from a stripe or a matrix of LEDs. Due to some optical (light absorption, reflectance, absorption, distortion, etc) or thermal features (temperature variation), the rendering of different LEDs may be different, despite they are powered in the same amount. This variable rendering causes non-uniformity in the projected light beam.

This problem has been assumed until now, but a solution therefor is provided.

SUMMARY OF THE INVENTION

The invention provides an alternative solution for improving the non-uniformity in the light beam by a method for correcting a light pattern according to claim 1, an automotive lighting device according to claim 8 and an automotive lighting assembly according to claim 10. Preferred embodiments of the invention are defined in dependent claims.

Unless otherwise defined, all terms (including technical and scientific terms) used herein are to be interpreted as is customary in the art. It will be further understood that terms in common usage should also be interpreted as is customary in the relevant art and not in an idealised or overly formal sense unless expressly so defined herein.

In this text, the term "comprises" and its derivations (such as "comprising", etc.) should not be understood in an excluding sense, that is, these terms should not be interpreted as excluding the possibility that what is described and defined may include further elements, steps, etc.

In a first inventive aspect, the invention provides a method for correcting a light pattern provided by a lighting device with a matrix of light sources, the method comprising the steps of a) obtaining a map of the light pattern divided in pixels;
b) associating a calibration power value to each pixel, depending on the light intensity of each pixel;
c) assigning a new power value to each pixel;
d) projecting a corrected light pattern with the new power values.

This method allows an in-situ or an external calibration of an automotive light pattern, wherein the light intensity of the corrected light pattern is more uniform than the original light pattern.

In some particular embodiments, the step a) comprises the sub-steps of projecting all the light sources at the same time, thus generating the first light pattern;

capturing and dividing the first light pattern in pixels.

In these embodiments, the map is obtained by lighting all the light sources at the same time, so that the light intensity of one light source may affect to the perceived light intensity in a neighbour pixel.

In some particular embodiments, the step a) comprises the sub-steps of projecting one light source at a time, generating individual projections;

generating a first light pattern gathering all the individual projections, wherein each pixel corresponds to an individual projection.

In these different embodiments, the map is obtained pixel by pixel. Hence, there is no need of a further division of the map in pixels, since each light source which is lighted individually provides the pixel itself to the map.

In some particular embodiments, in the step c), each new power value is inversely proportional to each calibration power value with respect to a reference power value.

The new power value tries to compensate the non-uniformity of the original map of the light pattern. As a consequence, one way of achieving this goal is establishing a reference value (which may be the mean value or not) and correcting the power values by increasing the power values on the pixels with a light intensity under the reference value and decrease the power values on the pixels with a light intensity above the reference value.

In some particular embodiments, the step c) comprises the sub-steps of assigning a new power value to each pixel;

project a test light pattern and check the uniformity of the test light pattern; and correct the power values assigned to each pixel.

In the event a single step is not enough to provide the required uniformity in the light pattern, the process of using test light patterns may be cycled if necessary.

In some particular embodiments, the power values are pulse width modulation values.

Pulse width modulation values are frequently used in controlling light sources, since they provide a way of changing the total power value without altering the maximum value.

In some particular embodiments, the method further comprises the step of recording a calibration map with the new power values.

This calibration map may be useful to be taken as default in different operations of the lighting device.

In a second inventive aspect, the invention provides an automotive lighting device comprising a matrix arrangement of solid-state light sources, intended to provide a light pattern;

a calibrator for performing the steps of the method according to the first inventive aspect.

This lighting device provides the advantageous functionality of auto-calibrating the uniformity of the light pattern provided.

In some particular embodiments, the matrix arrangement comprises at least 2000 solid-state light sources.

The term "solid state" refers to light emitted by solid-state electroluminescence, which uses semiconductors to convert electricity into light. Compared to incandescent lighting, solid state lighting creates visible light with reduced heat generation and less energy dissipation. The typically small mass of a solid-state electronic lighting device provides for greater resistance to shock and vibration compared to brittle glass tubes/bulbs and long, thin filament wires. They also eliminate filament evaporation, potentially increasing the life span of the illumination device. Some examples of these types of lighting comprise semiconductor light-emitting diodes (LEDs), organic light-emitting diodes (OLED), or polymer light-emitting diodes (PLED) as sources of illumination rather than electrical filaments, plasma or gas.

A matrix arrangement is a typical example for this method. The rows may be grouped in projecting distance ranges and each column of each group represent an angle interval. This angle value depends on the resolution of the matrix arrangement, which is typically comprised between 0.01° per column and 0.5° per column. As a consequence, the light intensity of each pixel may be adapted to generate a more uniform pattern.

In a third inventive aspect, the invention provides an automotive lighting assembly comprising an automotive lighting device; and an external calibrator for performing the steps of the method according to the first inventive aspect.

This assembly may be used in the manufacturing assembly line of a vehicle, to provide a calibrated light pattern just out of the line.

BRIEF LIST OF DRAWINGS AND REFERENCE NUMBERS

To complete the description and in order to provide for a better understanding of the invention, a set of drawings is provided. Said drawings form an integral part of the description and illustrate an embodiment of the invention, which should not be interpreted as restricting the scope of the invention, but just as an example of how the invention can be carried out. The drawings comprise the following figures:

FIG. 1 shows a general perspective view of an automotive lighting device according to the invention.

FIGS. 2*a* to 2*d* represent steps of a method according to the invention.

Figure 3:
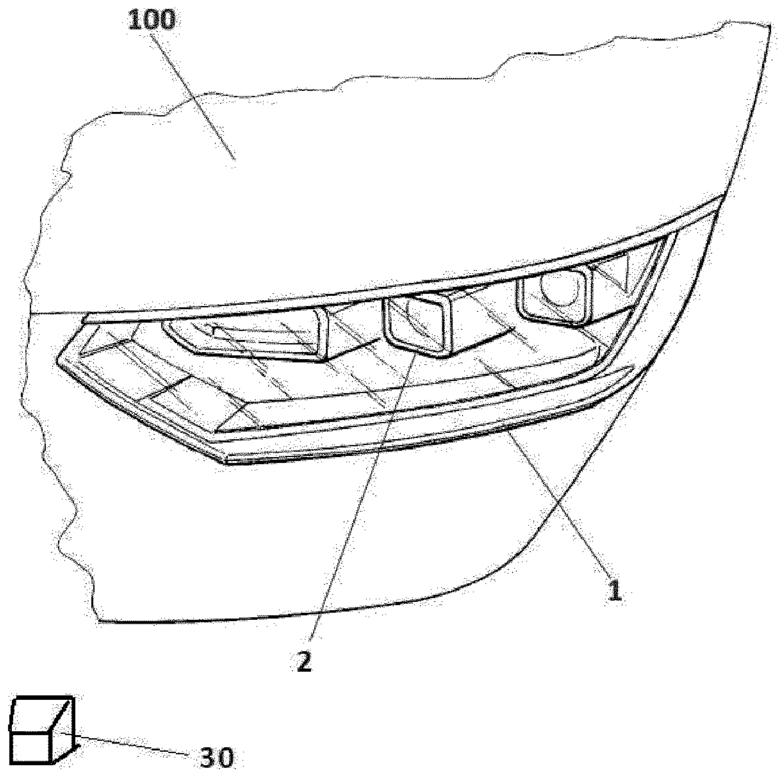

FIG. 3 shows an automotive lighting assembly according to the invention. In these figures, the following reference numbers have been used:

1 Lighting device
2 LED
3 Calibrator
4 Pixel
5 Reference value (intensity)
7 Original light pattern
8 Corrected light pattern
30 External calibrator
50 Reference value (PWM)
100 Automotive vehicle

DETAILED DESCRIPTION OF THE INVENTION

The example embodiments are described in sufficient detail to enable those of ordinary skill in the art to embody and implement the systems and processes herein described. It is important to understand that embodiments can be provided in many alternate forms and should not be construed as limited to the examples set forth herein.

Accordingly, while embodiment can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included.

FIG. 1 shows a general perspective view of an automotive lighting device according to the invention.

This lighting device 1 is installed in an automotive vehicle 100 and comprises a matrix arrangement of LEDs 2, intended to provide a light pattern;

a calibrator 3 to carry out an in-situ calibration of the uniformity of the light pattern provided by the matrix arrangement of LEDs 2.

This matrix configuration is a high-resolution module, having a resolution greater than 2000 pixels. However, no restriction is attached to the technology used for producing the projection modules.

A first example of this matrix configuration comprises a monolithic source. This monolithic source comprises a matrix of monolithic electroluminescent elements arranged in several columns by several rows. In a monolithic matrix, the electroluminescent elements can be grown from a common substrate and are electrically connected to be selectively activatable either individually or by a subset of electroluminescent elements. The substrate may be predominantly made of a semiconductor material. The substrate may comprise one or more other materials, for example non-semiconductors (metals and insulators). Thus, each electroluminescent element/group can form a light pixel and can therefore emit light when its/their material is supplied with electricity. The configuration of such a monolithic matrix allows the arrangement of selectively activatable pixels very close to each other, compared to conventional light-emitting diodes intended to be soldered to printed circuit boards. The monolithic matrix may comprise electroluminescent elements whose main dimension of height, measured perpendicularly to the common substrate, is substantially equal to one micrometre.

The monolithic matrix is coupled to the control centre so as to control the generation and/or the projection of a pixilated light beam by the matrix arrangement. The control centre is thus able to individually control the light emission of each pixel of the matrix arrangement.

Alternatively to what has been presented above, the matrix arrangement may comprise a main light source coupled to a matrix of mirrors. Thus, the pixelated light source is formed by the assembly of at least one main light source formed of at least one light emitting diode emitting light and an array of optoelectronic elements, for example a matrix of micro-mirrors, also known by the acronym DMD, for "Digital Micro-mirror Device", which directs the light rays from the main light source by reflection to a projection optical element. Where appropriate, an auxiliary optical element can collect the rays of at least one light source to focus and direct them to the surface of the micro-mirror array.

Each micro-mirror can pivot between two fixed positions, a first position in which the light rays are reflected towards the projection optical element, and a second position in which the light rays are reflected in a different direction from the projection optical element. The two fixed positions are oriented in the same manner for all the micro-mirrors and form, with respect to a reference plane supporting the matrix of micro-mirrors, a characteristic angle of the matrix of micro-mirrors defined in its specifications. Such an angle is generally less than 20° and may be usually about 12°. Thus, each micro-mirror reflecting a part of the light beams which are incident on the matrix of micro-mirrors forms an elementary emitter of the pixelated light source. The actuation and control of the change of position of the mirrors for selectively activating this elementary emitter to emit or not an elementary light beam is controlled by the control centre.

In different embodiments, the matrix arrangement may comprise a scanning laser system wherein a laser light source emits a laser beam towards a scanning element which is configured to explore the surface of a wavelength converter with the laser beam. An image of this surface is captured by the projection optical element.

The exploration of the scanning element may be performed at a speed sufficiently high so that the human eye does not perceive any displacement in the projected image.

The synchronized control of the ignition of the laser source and the scanning movement of the beam makes it possible to generate a matrix of elementary emitters that can be activated selectively at the surface of the wavelength converter element. The scanning means may be a mobile micro-mirror for scanning the surface of the wavelength converter element by reflection of the laser beam. The micro-mirrors mentioned as scanning means are for example MEMS type, for "Micro-Electro-Mechanical Systems". However, the invention is not limited to such a scanning means and can use other kinds of scanning means, such as a series of mirrors arranged on a rotating element, the rotation of the element causing a scanning of the transmission surface by the laser beam.

In another variant, the light source may be complex and include both at least one segment of light elements, such as light emitting diodes, and a surface portion of a monolithic light source.

FIGS. 2*a* to 2*d* represent steps of a method according to the invention.

Figure 2A:
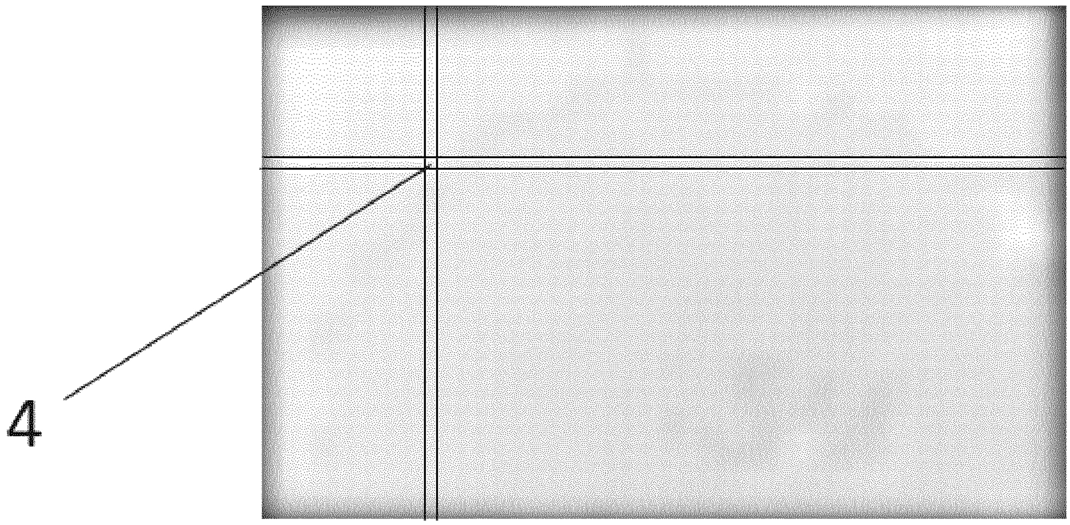

FIG. 2*a* shows a first step. In this step, all the light sources are projected at the same time, thus generating the first light pattern. This first light pattern is captured and divided into pixels 4. This first light pattern is the light pattern before calibration, so it may contain some non-uniformities which may provide visual discomfort or even errors in the perception of objects which are lighted.

In some alternatives of the method, this first light pattern may be calculated by the juxtaposition of the individual projections of each light source. Each pixel would correspond to the light projected by a single light source. This is a different way of obtaining this first map, and the convenience of one way or the other will depend on the car manufacturer.

Figure 2B:
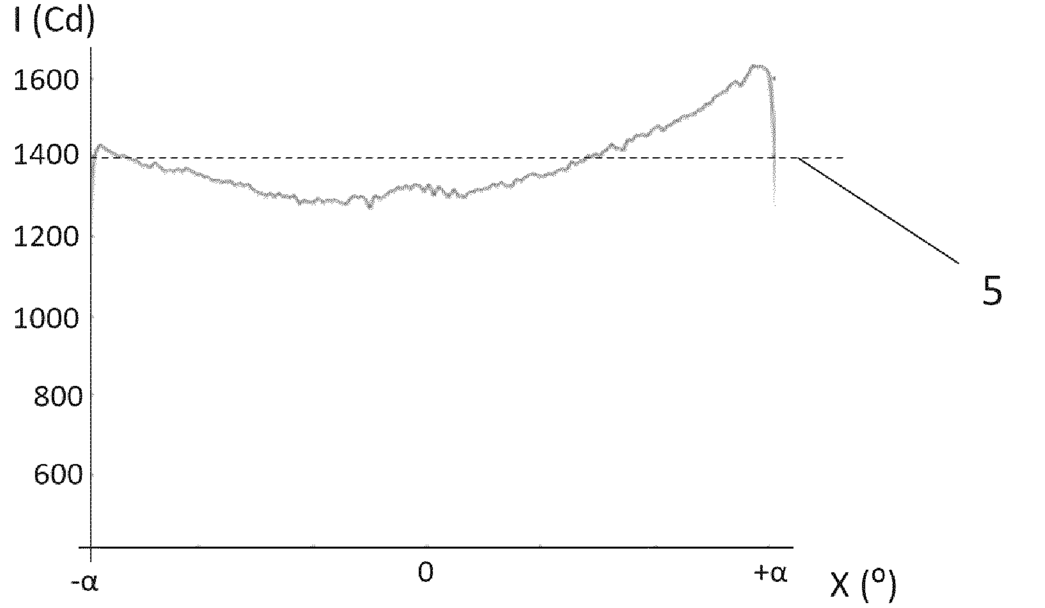

FIG. 2*b* shows some example of this non-unformity. In this graphic, the light intensity of a row of pixels is analysed as a function of the pixel's position, represented by the angle associated to each pixel. In this figure, it is shown that not all the pixels have the same light intensity. A reference value 5 is also shown in this figure. This reference value 5 will be used in further steps to correct this non-uniform light pattern.

Depending on the light intensity which has been captured in each pixel a calibration power value is associated to each pixel. This calibration power value will be directly proportional to the light intensity which has been sensed in the previous step. As a consequence, each pixel will have a calibration power value.

Figure 2C:
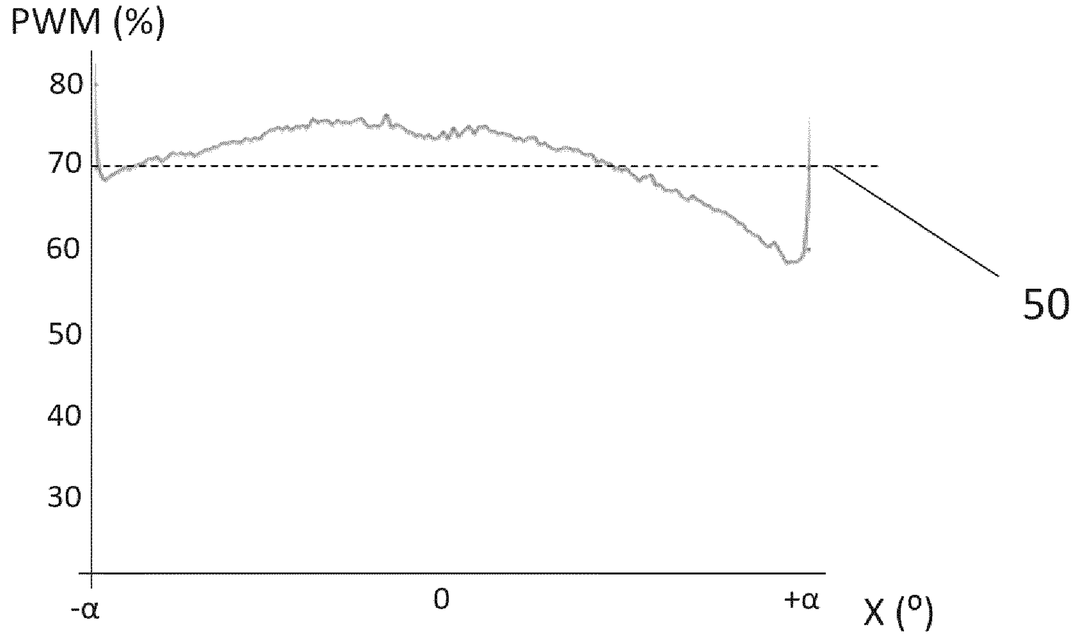

FIG. 2*c* shows a graphic which shows the new power values which are assigned to each pixel. These new power values, which are expressed as % PWM, try to compensate the non-uniformities, and are compared with a reference value 50, which represents the % PWM necessary to obtain the reference value of the light intensity (FIG. 2*b*). If one pixel had a calibration power value which is lower than the reference value, the new power value will be higher than the reference power value to compensate for other phenomena, which are causing a poorer light intensity.

Figure 2D:
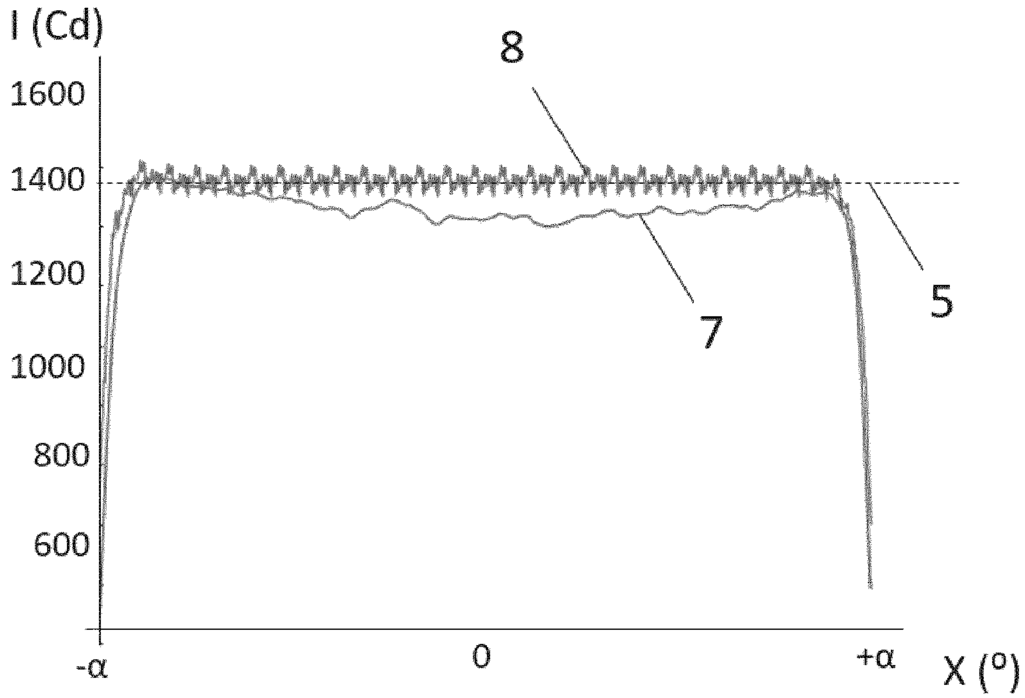

FIG. 2*d* shows a similar graphic as the one of FIG. 2*b*, but in this case, the light intensity of a row of pixels with the corrected light pattern is additionally shown, once that each pixel has been projected with the new power value. As may be seen, the corrected light pattern 8 is far more uniform than the original light pattern 7. If this light pattern is uniform enough, the calibration map with the new power values is recorded and the corrected light pattern is used to be projected.

In the event the corrected light pattern is not uniform enough, the step of assigning a new power value to each pixel may be iterated with the checking of a test light pattern using these new power values. This iteration would contain the following sub-steps:

- assigning a new power value to each pixel;
- project a test light pattern and check the uniformity of the test light pattern; and
- correct the power values assigned to each pixel.

In these particular examples, the power values are pulse width modulation values. The light driver in charge of controlling each light source will vary the pulse width modulation value so that each pixel is fed with the suitable value defined by the aforementioned calibration method.

FIG. 3 shows an automotive lighting assembly according to the invention. In this case, the automotive lighting device is a standard automotive lighting device and there is an external calibrator 30 which is suitable for performing the steps of the method described above. This makes it possible to use this invention also in standard lighting devices which does not comprise an embedded calibrator.

The invention claimed is:

1. A method for correcting a light pattern provided by a lighting device with a matrix of light sources, the method comprising:
- obtaining a map of the light pattern divided in pixels;
- associating a calibration power value to each pixel, depending on a light intensity of each pixel;
- assigning a new power value to each pixel; and
- projecting a corrected light pattern with the new power values,
- wherein each new power value is inversely proportional to a difference between a corresponding calibration power value of a pixel and a reference power value.

2. The method according to claim 1, wherein the obtaining the map of the light pattern divided in pixels comprises
- projecting all the light sources at the same time, thus generating a first light pattern; and
- capturing and dividing the first light pattern in pixels.

3. The method according to claim 1, wherein the obtaining the map of the light pattern divided in pixels comprises
- projecting one light source at a time, generating individual projections; and
- generating a first light pattern gathering all the individual projections, wherein each pixel corresponds to an individual projection.

4. The method according to claim 1, wherein the assigning a new power value to each pixel comprises
- assigning a new power value to each pixel;
- projecting a test light pattern and checking a uniformity of the test light pattern; and correcting the power values assigned to each pixel.

5. The method according to claim 1, wherein the power values are pulse width modulation values.

6. The method according to claim 1, further comprising recording a calibration map with the new power values.

7. An automotive lighting device comprising a matrix arrangement of solid-state light sources to provide a light pattern; and a calibrator configured to for performing the steps of the method according to claim 1 obtain a map of the light pattern divided in pixels, associate a calibration power value to each pixel, depending on a light intensity of each pixel, assign a new power value to each pixel, and project a corrected light pattern with the new power values, wherein each new power value is inversely proportional to a difference between a corresponding calibration power value of a pixel and a reference power value.

8. The automotive lighting device according to claim 7, wherein the matrix arrangement comprises at least 2000 solid-state light sources.

9. An automotive lighting assembly comprising:

an automotive lighting device; and an external calibrator configured to obtain a map of a light pattern divided in pixels, associate a calibration power value to each pixel, depending on a light intensity of each pixel, assign a new power value to each pixel, and project a corrected light pattern with the new power values, wherein each new power value is inversely proportional to a difference between a corresponding calibration power value of a pixel and a reference power value.

10. The method according to claim 2, wherein the assigning a new power value to each pixel comprises assigning a new power value to each pixel;

projecting a test light pattern and checking a uniformity of the test light pattern; and correcting the power values assigned to each pixel.

11. The method according to claim 2, wherein the power values are pulse width modulation values.

12. The method according to claim 2, further comprising recording a calibration map with the new power values.

13. The automotive lighting device of claim 7, wherein the calibrator is configured to project all the light sources at the same time, thus generating a first light pattern, and capture and divide the first light pattern in pixels to obtain the map of the light pattern.

14. The automotive lighting assembly of claim 9, wherein the external calibrator is configured to project light sources at the same time, thus generating a first light pattern, and capture and divide the first light pattern in pixels to obtain the map of the light pattern.

15. The method according to claim 3, wherein the assigning a new power value to each pixel comprises assigning a new power value to each pixel;

projecting a test light pattern and checking a uniformity of the test light pattern; and correcting the power values assigned to each pixel.

16. The method according to claim 3, wherein the power values are pulse width modulation values.

17. The method according to claim 3, further comprising recording a calibration map with the new power values.

18. The automotive lighting device of claim 7, wherein the calibrator is configured to:

project one light source at a time, generating individual projections, and generate a first light pattern gathering all the individual projections to obtain the map of the light pattern, wherein each pixel corresponds to an individual projection.

19. The automotive lighting assembly of claim 9, wherein the external calibrator is configured to:

project one light source at a time, generating individual projections, and generate a first light pattern gathering all the individual projections to obtain the map of the light pattern, wherein each pixel corresponds to an individual projection.

* * * * *